(12) United States Patent
Durham et al.

(10) Patent No.: US 7,870,565 B2
(45) Date of Patent: Jan. 11, 2011

(54) SYSTEMS AND METHODS FOR SECURE HOST RESOURCE MANAGEMENT

(75) Inventors: David M. Durham, Beaverton, OR (US); Tisson Mathew, Beaverton, OR (US); Travis Schluessler, Hillsboro, OR (US); Priya Rajagopal, Worcester, MA (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1452 days.

(21) Appl. No.: 11/173,885

(22) Filed: Jun. 30, 2005

(65) Prior Publication Data
US 2007/0006236 A1    Jan. 4, 2007

(51) Int. Cl.
  *G06F 9/44* (2006.01)
(52) U.S. Cl. ............................. 719/318; 719/321
(58) Field of Classification Search ............... 719/310, 719/318, 321, 327
See application file for complete search history.

(56) References Cited

U.S. PATENT DOCUMENTS

| | | | |
|---|---|---|---|
| 5,619,723 A * | 4/1997 | Jones et al. ..................... 710/3 |
| 6,587,876 B1 | 7/2003 | Mahon et al. |
| 6,601,082 B1 | 7/2003 | Durham et al. |
| 6,704,319 B1 | 3/2004 | Durham et al. |
| 6,751,659 B1 | 6/2004 | Fenger et al. |
| 6,973,488 B1 | 12/2005 | Yavatkar et al. |
| 6,996,551 B2 * | 2/2006 | Hellerstein et al. ............ 706/48 |
| 7,010,630 B2 * | 3/2006 | Pagan ......................... 710/100 |
| 7,028,229 B2 * | 4/2006 | McGuire et al. ............... 714/57 |
| 7,065,598 B2 | 6/2006 | Connor et al. |
| 7,072,958 B2 | 7/2006 | Parmar et al. |
| 7,110,540 B2 | 9/2006 | Rajagopal et al. |
| 7,120,118 B2 | 10/2006 | Rajagopal et al. |
| 7,194,556 B2 | 3/2007 | Rajagopal et al. |
| 7,197,664 B2 | 3/2007 | Khosravi |
| 7,200,146 B2 | 4/2007 | Khosravi et al. |
| 7,254,133 B2 | 8/2007 | Govindarajan et al. |
| 7,263,552 B2 | 8/2007 | Govindarajan et al. |
| 7,280,471 B2 | 10/2007 | Rajagopal et al. |
| 7,330,118 B2 | 2/2008 | Durham et al. |
| 7,350,115 B2 | 3/2008 | Mathew et al. |
| 7,409,472 B2 * | 8/2008 | Iwatani et al. ................. 710/36 |
| 7,542,026 B2 * | 6/2009 | Pagan ......................... 345/156 |
| 7,603,484 B2 * | 10/2009 | Dai et al. ........................ 710/5 |
| 2002/0143913 A1 | 10/2002 | Sahita et al. |
| 2003/0074434 A1 | 4/2003 | Jason et al. |
| 2003/0097496 A1 * | 5/2003 | Gabryjelski .................. 710/15 |
| 2003/0115246 A1 | 6/2003 | Mahon et al. |
| 2004/0024659 A1 | 2/2004 | Mathew et al. |
| 2004/0028046 A1 | 2/2004 | Govindarajan et al. |
| 2004/0100908 A1 | 5/2004 | Khosravi et al. |
| 2004/0131079 A1 | 7/2004 | Hegde et al. |
| 2004/0153998 A1 * | 8/2004 | McGuire et al. ............. 717/128 |

(Continued)

*Primary Examiner*—Van H Nguyen
(74) *Attorney, Agent, or Firm*—Schwegman, Lundberg & Woessner, P.A.

(57) ABSTRACT

Systems and methods are described herein to provide for secure host resource management on a computing device. Other embodiments include apparatus and system for management of one or more host device drivers from an isolated execution environment. Further embodiments include methods for querying and receiving event data from manageable resources on a host device. Further embodiments include data structures for the reporting of event data from one or more host device drivers to one or more capability modules.

13 Claims, 9 Drawing Sheets

U.S. PATENT DOCUMENTS

| | | |
|---|---|---|
| 2004/0240396 A1 | 12/2004 | Durham et al. |
| 2004/0249933 A1 | 12/2004 | Govindarajan et al. |
| 2004/0260841 A1 | 12/2004 | Mathew et al. |
| 2004/0268013 A1 * | 12/2004 | Pagan ..................... 710/313 |
| 2005/0071668 A1 | 3/2005 | Yoon et al. |
| 2005/0100019 A1 | 5/2005 | Sahita et al. |
| 2005/0108416 A1 | 5/2005 | Khosravi et al. |
| 2005/0114549 A1 | 5/2005 | Durham et al. |
| 2005/0135351 A1 | 6/2005 | Parmar et al. |
| 2005/0135380 A1 | 6/2005 | Sahita et al. |
| 2005/0138402 A1 | 6/2005 | Yoon et al. |
| 2005/0183082 A1 | 8/2005 | Lewites et al. |
| 2005/0190783 A1 | 9/2005 | Khosravi |
| 2005/0213768 A1 | 9/2005 | Durham et al. |
| 2005/0216577 A1 | 9/2005 | Durham et al. |
| 2005/0229246 A1 | 10/2005 | Rajagopal et al. |
| 2005/0273588 A1 | 12/2005 | Ong et al. |
| 2005/0276228 A1 | 12/2005 | Yavatkar et al. |
| 2005/0278499 A1 | 12/2005 | Durham et al. |
| 2005/0278563 A1 | 12/2005 | Durham et al. |
| 2005/0289311 A1 | 12/2005 | Durham et al. |
| 2005/0289316 A1 | 12/2005 | Durham et al. |
| 2006/0005015 A1 | 1/2006 | Durham et al. |
| 2006/0005245 A1 | 1/2006 | Durham et al. |
| 2006/0072480 A1 | 4/2006 | Deval et al. |
| 2006/0095551 A1 | 5/2006 | Leung et al. |
| 2006/0095580 A1 | 5/2006 | Khosravi et al. |
| 2006/0095961 A1 | 5/2006 | Govindarajan et al. |
| 2006/0095967 A1 | 5/2006 | Durham et al. |
| 2006/0095970 A1 | 5/2006 | Rajagopal et al. |
| 2006/0098646 A1 | 5/2006 | Sahita et al. |
| 2006/0206705 A1 | 9/2006 | Khosravi |

* cited by examiner

SYSTEMS AND METHODS FOR SECURE HOST RESOURCE MANAGEMENT

TECHNICAL FIELD

Various embodiments described herein relate generally to resource management on a host device and more particularly to secure host resource management.

BACKGROUND

A conventional computing platform may include diagnostic hardware tools. An operator may employ these tools to maintain, monitor and/or troubleshoot the computing platform. Additionally, the platform may include one or more hardware devices intended to control the environment within which the platform is operating. Examples of such devices include fans, network cards, and the like. Each of these devices and any other diagnostic tools communicate with the platform using separate and proprietary mechanisms.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of embodiments of the invention, reference is made to the accompanying drawings which form a part hereof, and in which are shown, by way of illustration, specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed.

Figure 1:
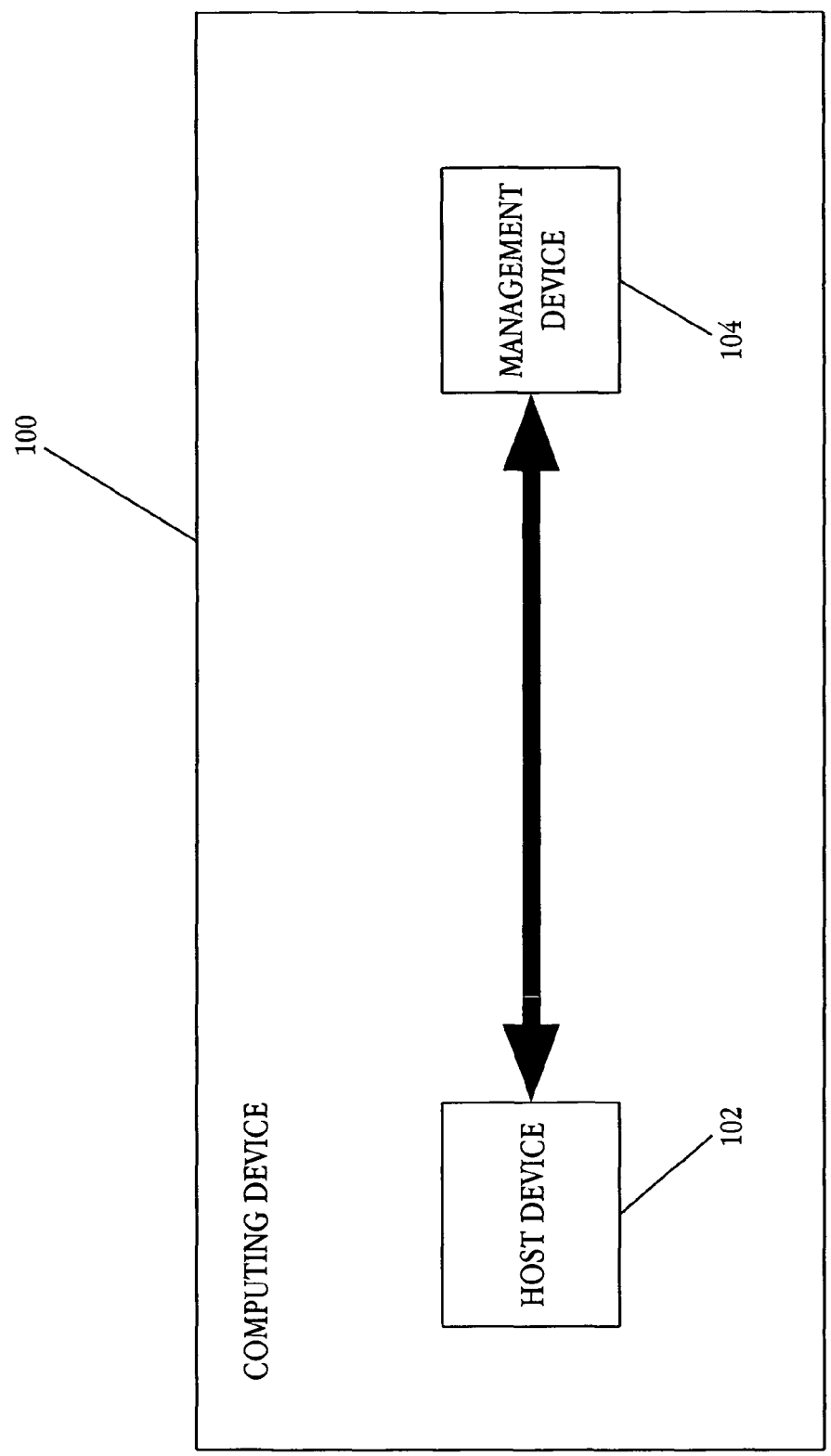
FIG. 1 is a high level block diagram of a device according to embodiments of the present invention.

FIG. 1 is a high level block diagram of a device according to embodiments of the present invention. In an embodiment, a computing device 100 includes a host device 102 and a management device 104. In a further embodiment, the host device 102 and the management device 104 are communicatively coupled through any suitable communications bus. Though depicted in FIG. 1 as being contained within a single computing device, it should be appreciated that the management device 104 may be separately contained in some embodiments. In such an arrangement, the management device 104 is communicatively coupled to the host device 102 through any suitable means. The bus may represent one or more busses, e.g., USB (Universal Serial Bus), FireWire, PCI, ISA (Industry Standard Architecture), X-Bus, EISA (Extended Industry Standard Architecture), or any other appropriate bus and/or bridge (also called a bus controller).

In an embodiment, the host device 102 is configured to perform operations implementing an operating system and other software applications. Operating systems may include operating systems based on Windows®, Unix, Linux, Macintosh®, and operating systems embedded on a processor. The host device 102 may include, without limitation, desktop PC, server PC, PDA, etc. The host device 102 is further configured to run one or more software applications. In an embodiment, the software applications report events regarding their operations. The software applications include, without limitation, stand alone software applications (i.e. word processing applications, login applications, and the like) and software applications that control hardware devices. Hardware devices include, without limitation, network interface cards, bus controllers, memory controllers, graphics cards, storage controllers and the like. In a further embodiment, the host device 102 includes one or more managed entities where each managed entity is configured to perform operations on a computing device. In such an arrangement, each of the managed entities can be configured to execute a separate instance of an operating system and software applications, and has the advantage of isolated operations of one managed entity from each of the other managed entities.

In an embodiment, the management device 104 is configured to perform management operations. Management operations include operations intended to cause a change in some operating condition of the host device 102. Examples of management operations include, without limitation, setting network speed on a network interface, setting an auto-negotiation features of a network interface, sending a command to alter the performance of a software controlled environmental control device. In an embodiment, the management device 104 is configured to be executed inside an isolated execution environment. In an embodiment, an "isolated execution environment" is an execution environment that is configured to execute code independently and securely isolated from a host that it is communicatively coupled to. In a further embodiment, the isolated execution environment is further configured to prevent software running on the host from performing operations that would alter, modify, read, or otherwise affect the code store or executable code that is running in the isolated execution environment. In the context of the present application, the management device 104 is executed inside an isolated execution environment which prevents all software executed by the host device 102 from altering or reading any instructions contained on the management device 104.

In a further embodiment, the host device 102 and the management device 104 may be communicatively coupled through a bus as described above. The management device 104 may include, without limitation, a service processor, an embedded microcontroller, a virtual partition and the like.

In an embodiment, the host device 102 is configured to send event data to the management device 104. In such an arrangement, the management device 104 is configured to receive the event data and perform operations using that data. Operations may include, without limitation, comparing with pre-set threshold values, combining the event data with other event data to determine some operating condition on the host device 102, combining the event data with other data received from the host device 102 or some other managed hardware device.

Figure 2:
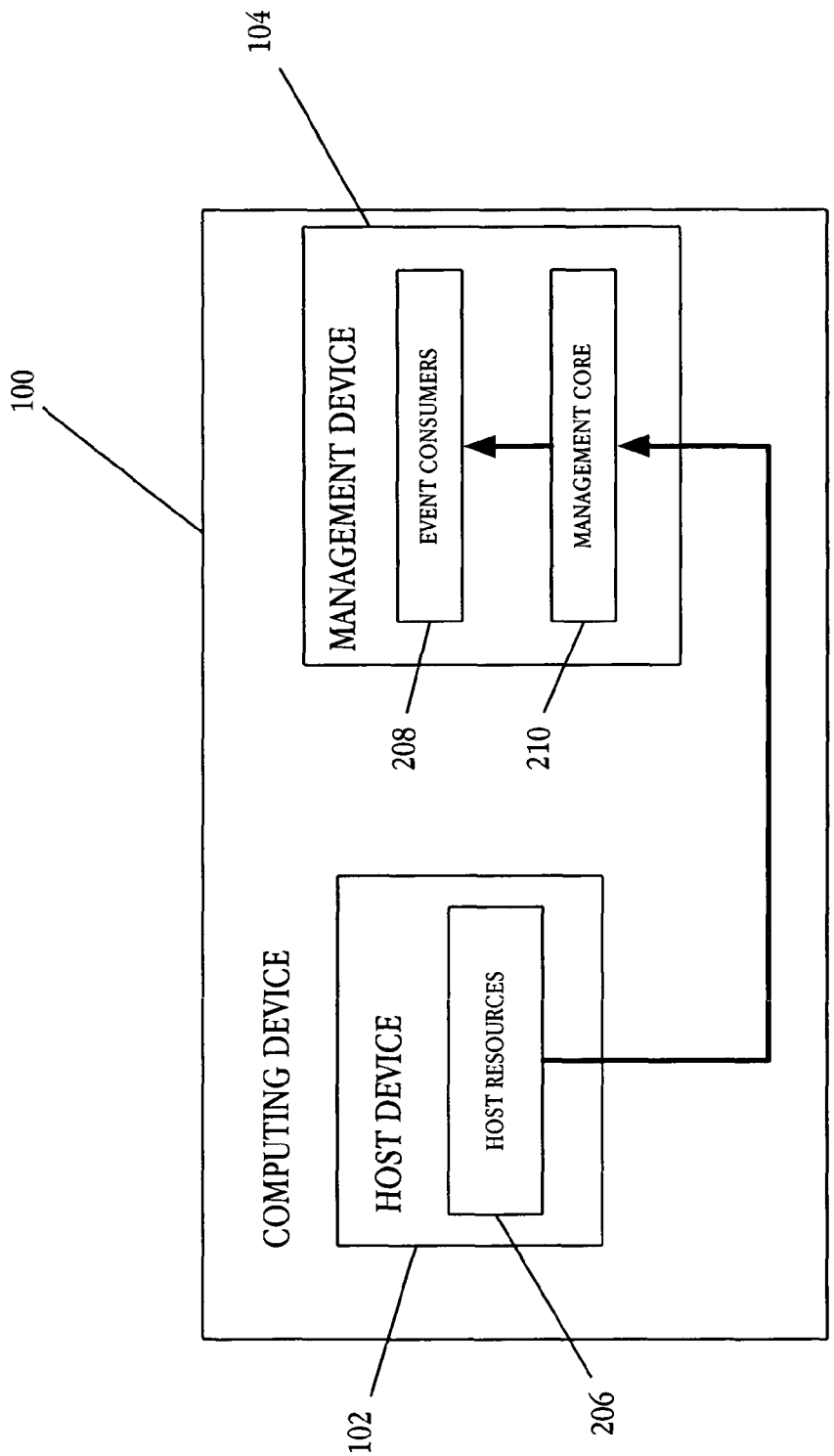
FIG. 2 is a high level block diagram of a device according to embodiments of the present invention.

FIG. 2 is a high level block diagram of a device according to embodiments of the present invention. In an embodiment, the computing device 100 includes a host device 102 and a management device 104 communicatively coupled. The host device 102 includes one or more host resources 206. The management device 104 includes one or more event consumers 208 and a management core 210.

In an embodiment, the one or more host resources 206 include one or more hardware devices coupled to the host device 102. In another embodiment, the one or more host resources 206 include one or more software resources that are configured to communicate to the management core 210 through a host resident software agent or host device driver. Examples of software resources include, without limitation, firmware modules and operating system device drivers. In a further embodiment, the one or more host resources 206 include a combination of hardware devices and software resources. The one or more host resources 206 of the host device 102 are configured to detect conditions occurring in the host device 102 and send an event message to the management core 210 of the management device 104. In one embodiment, the event message includes an event Resource Data Record (RDR). The event RDR is discussed in greater detail below with respect to FIG. 7.

In an embodiment, the management core 210 is configured to receive event messages from the one or more host resources 206. In another embodiment, the management core 210 is configured to poll the one or more host resources 206. In such an arrangement, the one or more host resources 206 send an event message to the management core 210 in reply.

In an embodiment, the one or more event consumers 208 are software modules configured to receive event messages from the management core 210. In a further embodiment, the one or more event consumers 208 include software modules that are configured to subscribe to one or more event types. Event types are logical groupings of various events that can be reported by the one or more host resources 206. An example of an event type may be network operations. Events grouped under the network operations event types might include, without limitation, network interface card (NIC) up, NIC down, packets sent, packets received and the like. An event consumer that monitors network operations would receive all of those events if the event consumer was subscribed to that network type.

Figure 3:
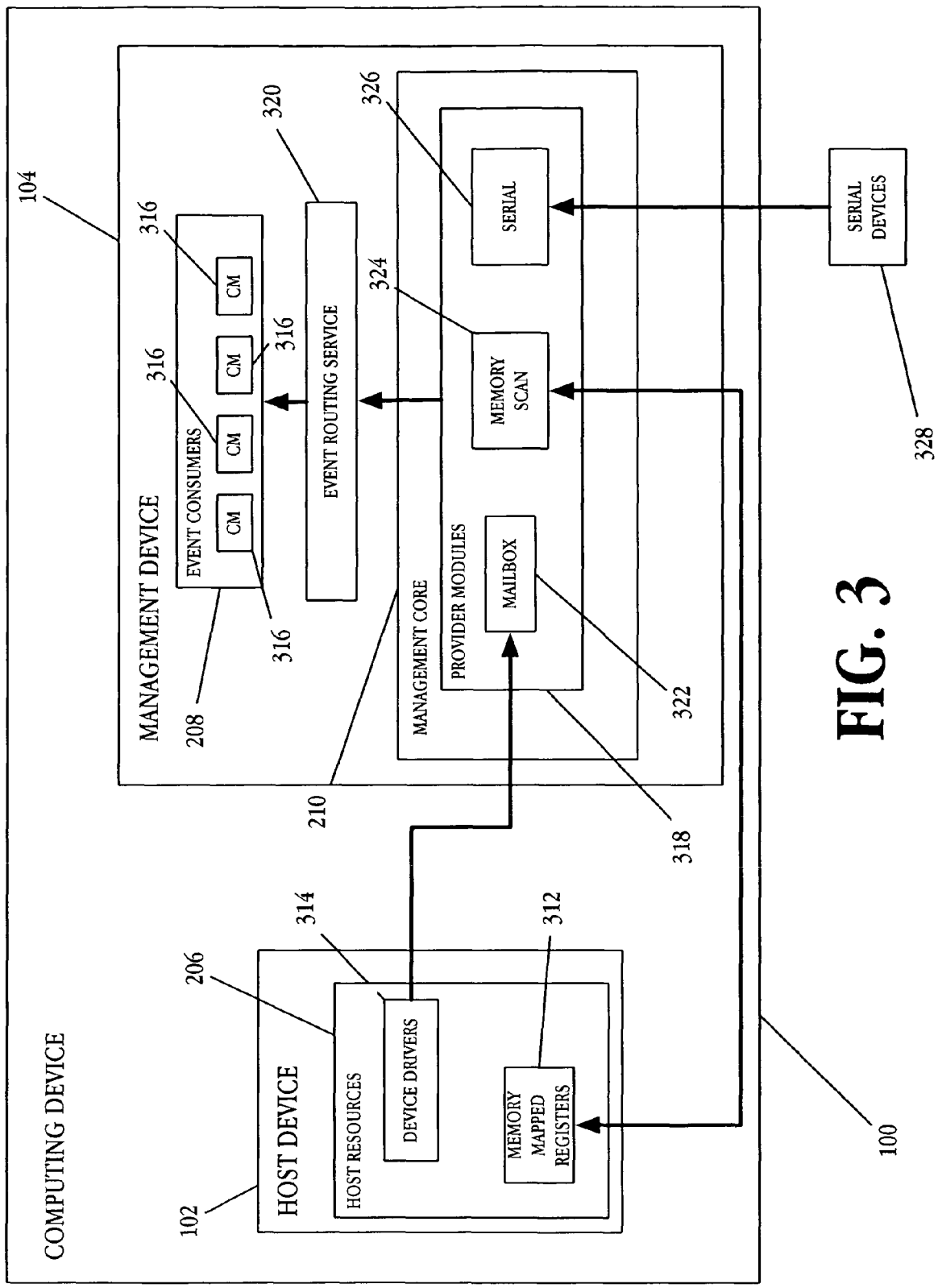
FIG. 3 is a high level block diagram of a device according to embodiments of the present invention.

FIG. 3 is a high level block diagram of a device according to embodiments of the present invention. In an embodiment, host resources 206 of the host device 102 include one or more memory mapped registers 312 and one or more host device drivers 314. In an embodiment, event consumers 208 of the management device 104 comprise one or more capability modules (CM) 316. In an embodiment, the management core 210 includes one or more provider modules 318. In one embodiment, the one or more provider modules 318 are coupled to the one or more CMs 316 through an event routing service 320. In an embodiment, host device drivers 314 include, without limitation, ring 3 software applications and ring 0 software applications. Ring 3 software applications include individual software applications which are executed in an environment that restricts certain functions (such as memory mapping) that might impact other software applications. In such an arrangement, the operating system retains control to ensure smooth operations of the software applications. Ring 0 software applications may include an operating system, but is not limited to just operating systems, and are applications that are executed in an environment which affords the Ring 0 software applications privileged access to the widest range of host device 102 and computing device 100 resources.

In an embodiment, the management device 104 is executed within an isolated execution environment such that operations on the host device 102 are not capable of accessing or otherwise altering the code executed on the management device 104.

In an embodiment, the one or more provider modules 318 are low-level software components that supply a message receipt and delivery service to the management core 210 and the management core 210 sends those messages to the event routing service 320. In a further embodiment, the one or more provider modules 318 are configured to enable communications with the one or more host resources 206. In an embodiment, the one or more provider modules 318 include a mailbox interface 322, a memory scan interface 324 and a serial interface 326.

In an embodiment, the mailbox interface 322 uses any suitable transport mechanism for receiving event messages from the one or more host resources 206. In an embodiment, the mailbox interface 322 is configured to retrieve host resource event information and send control information using a message-type delivery scheme. Such a message-type delivery scheme can be implemented on any variety of lower layer bridge mechanisms as are well known in the art. In an embodiment, the mailbox interface 322 is configured to communicate using Direct Memory Access (DMA). In another embodiment, the mailbox interface 322 is configured to communicate using any bus, as described above, available to the computing device 100. In a further embodiment, the mailbox interface 322 includes a DMA mailbox interface configured to use DMA to access physical memory of the host device 102. In such an arrangement, the DMA mailbox interface is configured to manage the resources for communicating with the DMA host device drivers 314 on the host device 102. In one embodiment, the DMA mailbox interface is configured to manage resources using a First-In-First-Out (FIFO) arrangement, such that messages are processed as they are received.

In an embodiment, the memory scan interface 324 is configured to directly read memory mapped registers 312. In one embodiment, the memory mapped registers contain sensor data from sensors coupled to the host device 102. In one embodiment, the memory scan interface 324 uses DMA to access the host memory. In an embodiment, the memory scan interface 324 is configured to access physical memory addresses of the host device 102. In another embodiment, the memory scan interface 324 is configured to access virtual memory addresses of the host device 102. In either embodiment, the memory scan interface is configured to directly read memory mapped registers 312 of the host device 102 independent of the host device 102.

In an embodiment, the serial interface 326 is configured to handle communications with serial devices on the computing device 100. In one embodiment, the serial interface 326 implements similar functionality as the mailbox interface 322 in that it receives event data from one or more serial devices 328. In an embodiment, a separate serial interface 326 is present for each of one or more serial devices 328. In an embodiment, the serial interface 326 is configured to receive messages using any suitable protocol and translate the messages into messages operable by the management core 210. In another embodiment, the serial interface 326 is configured to receive messages from the management core 210 and translate the messages into a message suitable for sending over an appropriate serial protocol. In an embodiment, the serial interface 326 is configured to communicate with a serial device 324 using an appropriate underlying serial protocol for that device. In such an arrangement, a separate instance of the serial interface 326 is used for each distinct serial protocol implemented. For example, each of the serial devices 328 on the computing device may be configured to operate using different serial protocols, such as, Intelligent Platform Management Interface (IPMI), System Management Bus (SM-Bus), and Intelligent Interface Controller (I2C). Additionally the serial device may be configured to communicate using the Hardware Platform Interface (HPI) application programming interface (API). In such an arrangement, each of the serial devices 328 communicates with an individual instance of the serial interface 326.

Figure 4:
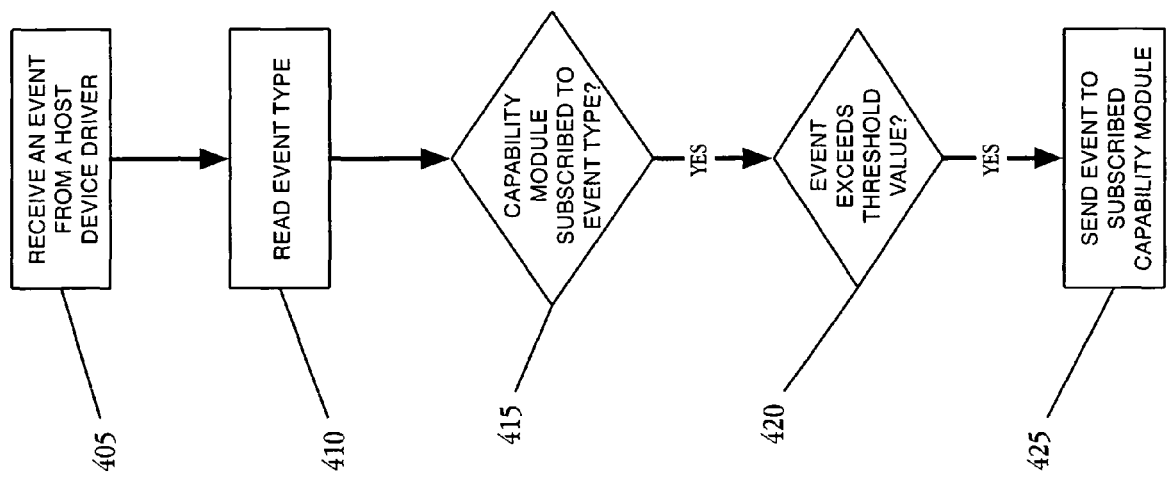
FIG. 4 is a flowchart of a method according to embodiments of the present invention.

FIG. 4 is a flowchart of a method according to embodiments of the present invention. In an embodiment, the operations in FIG. 4 are carried out in an isolated secure environment. In a further embodiment, the operations of FIG. 4 are carried out in a management core 210 as contemplated in FIG. 2 and described above.

As discussed above, a host device driver 206 is configured to sense conditions on a device. At block 405 the host device driver sends to the management core 210 an event message. In an embodiment, the event message is an event RDR. At block 410, the management core 210 reads the event type contained within the event message and determines which if any of the one or more CMs 316 are subscribed to that event type at block 415. In one embodiment, the event type is contained within the RDR header of the event RDR. In another embodiment, the event type is contained within the event message. Each of the one or more CMs 316 are configured to perform management tasks for logical groupings of operations on a host device 102. Use of the event type information by the management core 210 ensures that only those CMs 316 concerned with that event type and the event data associated with receive the event data.

At block 420, the management core 210 determines if the event exceeds a threshold value set by a CM 316 that is subscribed to the event type. In one embodiment, the management core 210 received threshold values from the subscribed CM 316 when the subscribed CM 316 first subscribed to that event type. In another embodiment, the management core 210 receives a threshold value from the subscribed CM 316 at some time after the initial subscription. In such an arrangement, the subscribed CM 316 is able to respond to changing system conditions, such as, without limitation, temperature, operating conditions of the host device 102, network operations, etc.

At block 425, the management core 210 sends the event message to the subscribed CM 316. In an embodiment, the management core 210 sends the event message to the subscribed CM 316 through the event routing service 320. The CM 316 performs additional operations on the received event data. Such additional operations include, without limitation, storing the event data, comparing the event data with previously received similar event data for the purposes of detecting trends in system conditions, comparing the event data with other received event data to detect overall system conditions, performing operations using the event data, other event data to generate management instructions intended to cause a change in the operations being performed on the host device 102 and sending notification of the event to a remote management station, such as the management device 104.

Though depicted as a single sequence of operations, the management core 210, in an embodiment, is configured to perform multiple instances of the operations depicted in FIG. 4 concurrently. In such an arrangement, the management core 210 can communicate with more then one host device driver 314 and receive more then one event at a time.

In one embodiment, the management core 210 receives events from a host device driver through an interface module as discussed above with respect to FIG. 3. In such an arrangement, the event data may be received on any of the following: mailbox interface 322, memory scan interface 324, or serial interface 326. This is not meant to be limiting, and any interface configured to receive event data from a host device driver using an RDR data format as described below in more detail with respect to FIG. 7 and sending that event data to a management core 210 is considered to be within the scope of the present discussion. In one embodiment, the mailbox interface 322 receives event data over a DMA channel. In another embodiment, the mailbox interface 322 receives event data over any suitable bus protocol. In one embodiment, the memory scan interface 324 receives the contents of a page in memory over a DMA channel. In one embodiment, the serial interface 326 is configured to communicate using the HPI API. In another embodiment, the serial interface 326 receives event data over an IPMI bus. In a further embodiment, the serial interface 326 is configured to receive events using a format other then a event RDR data format and translate the received event into an event RDR data format and send the translated event to the management core 210 where operations can proceed as discussed above. Usage of the serial interface 326 to translate received events into an event RDR data format allows the management device 104 to detect conditions on legacy serial devices 328 and manage those devices using the same procedures that the management device 104 uses to manage software resources on the host device 102.

Figure 5:
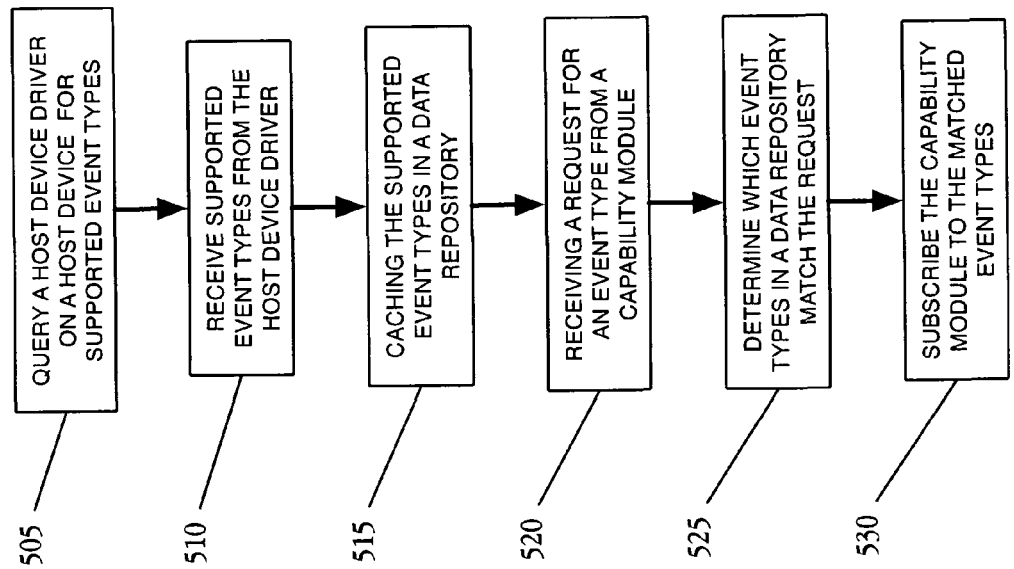
FIG. 5 is a flowchart of a method according to embodiments of the present invention.

FIG. 5 is a flowchart of a method according to embodiments of the present invention. In an embodiment, the operations depicted in FIG. 5 show operations following the starting of a host device 102. In another embodiment, the operations depicted in FIG. 5 show operations following the hot-swapping of a hardware device on the host device. Hot-swapping includes, without limitation, connecting a hardware device over any suitable communications bus while the host device is running. In an embodiment, the operations depicted in FIG. 5 are carried out in a management core 210 as depicted in FIG. 2 and discussed above.

At block 505, the management core 210 queries a host device driver 314 on a host device 102 for event types supported by the host device driver 314. In an embodiment, the management core 210 queries each of the host device drivers 314 on the host device 102. An example of event types is network operations. At block 510, the management core 210 receives from the host device driver 314 event types supported by the host device driver 314. At block 515, the management core 210 caches the received event types. In an embodiment, the management core 210 caches the received event types in a resource data record repository. In one embodiment, operations cease after the received event types are cached at block 515. In another embodiment, some time after the operations at blocks 505 to 515, a CM 316 requests for an event types from the management core 210 at block

520. At block 525, the management core 210 compares the requested event type with event types stored in the data repository and determines which of the stored event types match the request. At block 530, the management core subscribes the CM 316 to the matched event types. In an embodiment, the operations at blocks 520 to 530 provide an efficient means for a management device 104 to load in a CM 316 or process an event type subscription from a CM 316. The data repository stores a list of all event types supported by the host device drivers 314 on the host device. By matching the request from the CM 316 received at block 525, the management core avoids having to query or re-query each of the host device drivers 314 each time a CM 316 requests a subscription to an event type.

Figure 6:
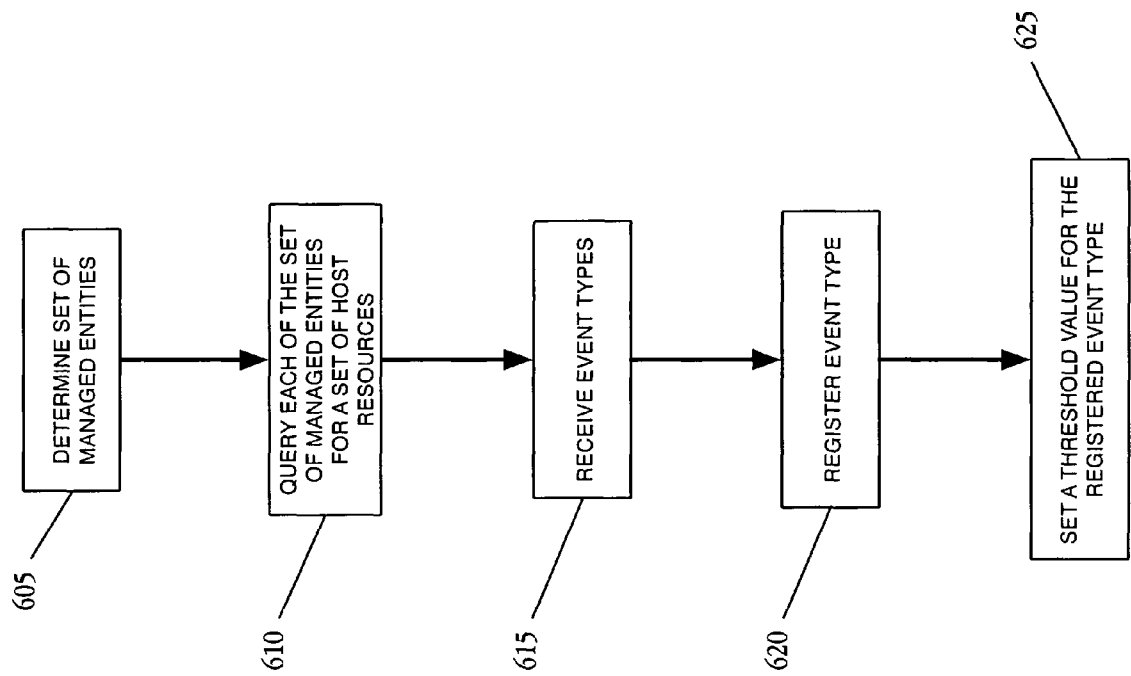
FIG. 6 is a flowchart of a method according to embodiments of the present invention.

FIG. 6 is a flowchart of a method according to embodiments of the invention. In an embodiment, the operations depicted in FIG. 6 are carried out on a management device 104 as discussed above with respect to FIG. 2 and FIG. 3. In an embodiment, the operations depicted in FIG. 6 are performed when the management device 104 initializes operations. In another embodiment, the operations depicted in FIG. 6 are performed any time the management device 104 restarts. In yet another embodiment, the operations depicted in FIG. 6 are performed at any time if it becomes necessary for the management device 104 to determine what manageable resources are presently running on the host device 102.

At block 605, the management device 104 determines a set of managed entities present on the host device 102. In one embodiment, managed entities register with the management device. Registration with the management device includes without limitation, voluntary registration and pre-registration. In another embodiment, the management device 104 determines the set of managed entities by scanning memory on the host device 102. In a further embodiment, any method that for determining the presence of managed entities on a device is considered within the scope of the present discussion and discussion of specific methods is not meant to be limiting in any manner.

As discussed above, the host device 102 includes, in an embodiment, one or more managed entities, each of which is configured to execute independently of the others. At block 610, the management device 104 queries each of the set of managed entities for a set of manageable resources on the managed entity. In one embodiment, the manageable resource is a host device driver 314. In another embodiment, the manageable resource is a ring 3 software application. At block 615, the management device 104 receives event types. In one embodiment, at block 615, the management device 104 receives from each of the managed entities event types supported by the manageable resources on the managed entity. In another embodiment, at block 615, the management device 104 receives from each of the manageable resources event types supported by the manageable resources. The management device 104 at block 620 registers the event types with the event routing service 320. At block 625 a threshold value for the event type is set for the registered event type. In one embodiment, the threshold value is set to a default value by the management device 104 at block 625. In another embodiment, the threshold value is communicated to the event routing service 320 and set at block 625 from a CM 316 when the event type is registered with the event routing service 320. In a further embodiment, the threshold value is set or modified at some time later by the CM 316.

Figure 7:
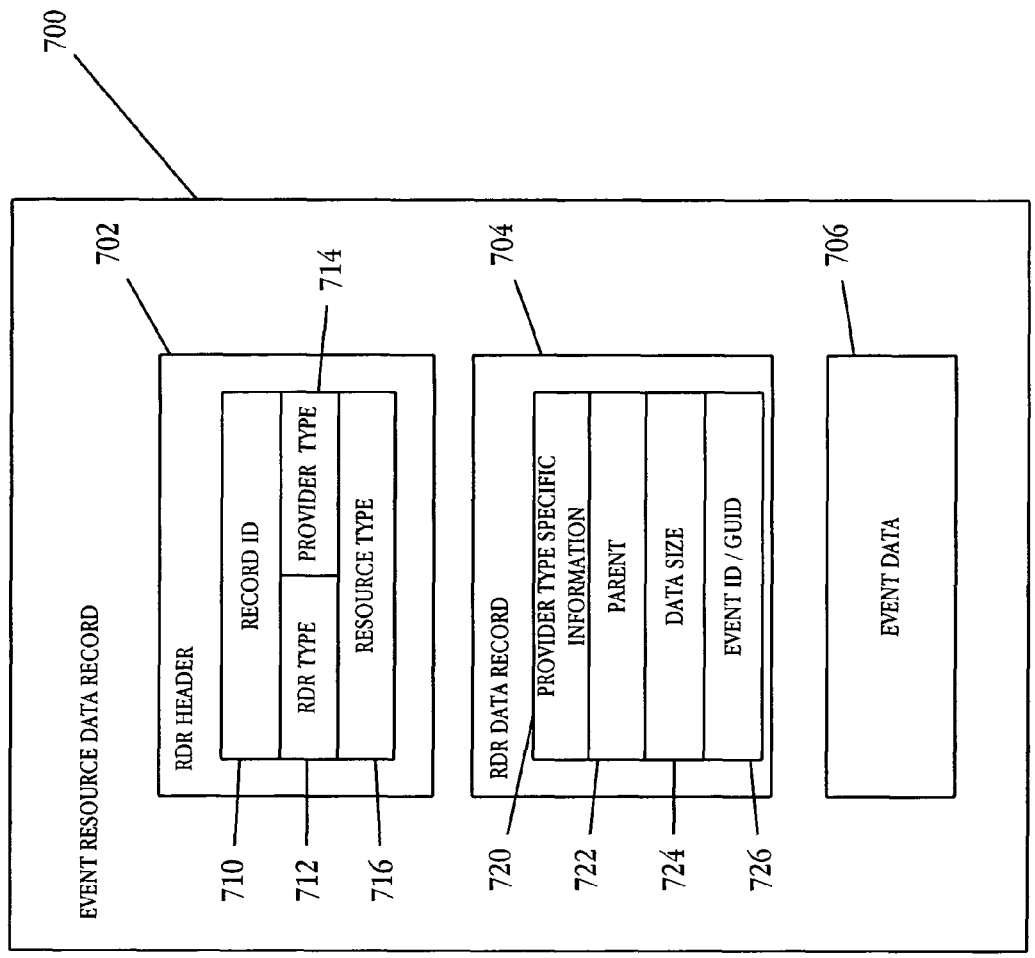
FIG. 7 is an example of a data structure according to embodiments of the present invention.

FIG. 7 is an example data structure according to embodiments of the present invention. In an embodiment, the Event Resource Data Record (RDR) 700 is used by host device drivers 314 on a host device 102 to report conditions to a management core 210. The event RDR data format provides to the host device drivers 314 and other managed resources on the host device 102 a common message delivery format for all event reporting. Developers of manageable software or hardware need not program specific delivery formats into their products in order for those products to communicate conditions to a management core 210. Further, developers of CMs 316 configured to subscribe to event types of a management core 210 need not program their CMs 316 to understand all the variety of reporting formats that all manageable resources can use. A further benefit to using a common message format for the reporting of event conditions is that older device hardware that can not be re-configured to support newer event data formats can be communicated with through an interface that is capable of translating event conditions reported by the older device hardware into the event RDR format, such that the management core 210 and CMs 316 are capable of communicating to that older device hardware in the same manner that communications with other managed resources on the host device 102 are done.

In an embodiment, the Event RDR 700 includes an RDR header 702, a Data Record 704 and event data 706. The Event RDR 700 provides a common way for all managed resource to report present conditions.

In an embodiment, the RDR header 702 is a header common to all Event RDRs 700, regardless of the event data 706 that is being reported in the Event RDR 700. The RDR header 702 includes a Record ID 710, an RDR type 712, a Provider Type 714 and a Resource Type 716. The Record ID 710 provides a unique identifier for individual instances of manageable resources on the host device 102. In an embodiment, the Record ID 710 provides a unique 64-bit identifier. In a further embodiment, the unique 64-bit identifier contains a 32-bit device selector identifier and a 32-bit device record ID. In an embodiment, the 32-bit device selector is used by the management core 210 to address a host device driver through an interface module. In an embodiment, the 32-bit device record ID is a unique identifier assigned by the host device driver. The RDR type 712 specifies a top-level identifier for types of records. RDR types include, without limitation, sensor, effector/control, entity, event and association. The Provider Type 714 specifies an interface module to be used to access the Event RDR 700. Provider Types 714 include, without limitation, physical memory scan, virtual memory scan, DMA mailbox, Alert Standard Format (ASF) and HPI/IPMI. The Resource Type 716 identifies the specific event type that comprises the particular Event RDR 700 that contains it. The Resource Type 716 defines the format of the remainder of the Event RDR 700. In an embodiment, the Resource Type 716 may be further defined by hardware and software vendors and used to describe standard and non-standard manageable resources. In an embodiment, the Resource Type 716 uses two 32 bit numbers, a first 32 bit number for Company ID in the form of an Internet Assigned Number Authority (IANA) Private Enterprise Number and a second 32 bit number that is a subtype relative to the Company ID.

In an embodiment, the Data Record 704 specifies the capabilities and attributes of manageable resources and associations between the attributes. Examples of Data Record 704 types include, without limitation, Entity, Sensor, Effector, Event RR and Association. The entity type Data Record 704 provides detailed identification information for a manageable entity including the path to the entity and a description of the entity. The sensor type Data Record 704 describes a manageable resource that is capable of reading operational or health data (i.e. fan controller or network interface controller). In an embodiment, the sensor type Data Record 704 belongs to one manageable resource or entity. The effector type Data Record 704 describes a manageable resource that is capable of controlling some aspect of the operations of the host device 102 (i.e. powering on a fan or enabling a feature on a NIC). In an embodiment, the effector type Data Record 704 belongs to one manageable resource or entity. The event type Data Record 704 describes a manageable resource or entity's ability to generate asynchronous events. In an embodiment, the event type Data Record 704 belongs to one manageable resource or entity. The association type Data Record 704 describes a logical relationship between Event RDRs 700 of any type. In an embodiment, the type and scope of the relationship is determined by information included with the association type Data Record 704.

In an embodiment, the Data Record 704 includes a Hard Data Record and Soft Data Record. In an embodiment, the Hard Data Record is constructed by a serial interface module to wrap a serial record within an Event RDR 700 as described above to provide compatibility between events from hardware devices on the computing device with manageable resources on the host device 102. In an embodiment, the Data Record 704 includes Provider Type Information 720, Parent Information 722, Data Size 724 and an Event ID 726. Provider Type Information 720 includes information regarding the interface module that the Host Device Driver 314 is configured to communicate with.

In an embodiment, the Event Data 706 contains information regarding the actual event that is being reported in the Event RDR 700. Information regarding the actual event may include, without limitation, environmental conditions, operating conditions, state of operations, contents of a memory mapped register, etc. In an alternate embodiment, the Event Data 706 is contained within the Data Record 704.

In an embodiment, the Event RDR 700 message format defines a format the provides the ability for elements of a management device 104 and manageable resources on a host device to communicate using a consistent method of management for both hardware and software resources. This format provides developers of CMs 316 the ability to provide the CMs 316 with the ability to communicate with any of a variety of manageable resources on a host device 102 without regard to what the manageable resource is managing, provided the manageable resource is also configured to communicate its conditions using the Event RDR format as shown in FIG. 7. Further, the format provides developers of host device drivers 314 the ability to report conditions on the host device and receive control messages from a management device 104 without regard to the exact construction of the management device 104, provided the management device 104 is configured to read and send messages to and from the manageable resource using this format.

Though depicted and described as separate and distinct functional data blocks in FIG. 7, it will be appreciated that all data blocks or some data blocks may be combined into single data blocks without departing from the scope of the embodiments described herein.

Figure 8A:
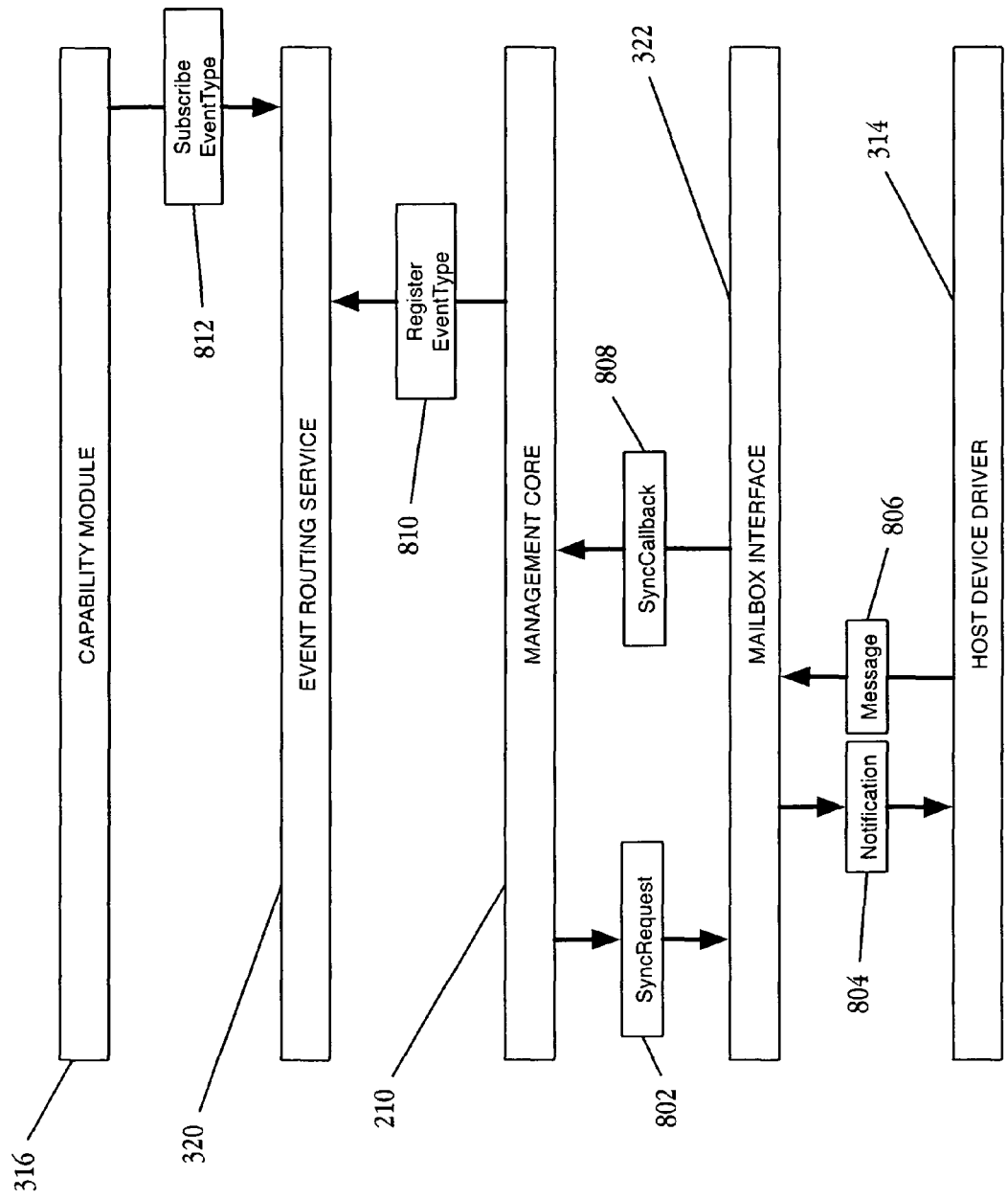
FIG. 8A is an example dataflow diagram to be carried out on a device according to embodiments of the present invention.

FIG. 8A is an exemplary dataflow diagram to be carried out on a device according to embodiments of the present invention. In an embodiment, the operations depicted in FIG. 8A follow the discovery of a manageable resource on a host device 102 by the management core 210. Discovery includes, without limitation, discovery during initial start-up of the management device 104, discovery during subsequent restarts of the management device 104, discovery during registration of a CM 316 not previously present.

Following discovery of a host device driver by any suitable means, the management core 210 sends a SyncRequest message 802 to the mailbox interface 322. The mailbox interface 322 sends a notification message 804 to the host device driver 314 requesting event types from the host device driver 314. The host device driver 314 responds with a message 806 containing the requested event types sent to the mailbox interface 322. The mailbox interface 322 sends a SyncCallback message 808 to the management core 210. The management core 210 registers the event type with the Event Routing Service 320 using a Register_EventType message 810. In one embodiment, CMs 316 are queried by the event routing service 320 to determine if the CM 316 should be subscribed to the event type identified in the Register_EventType message 810. Such subscription would be in the form of a Subscribe_EventType message 812 sent from the CM 316 to the event routing service 320. In another embodiment, as the CM 316 is first executed it requests subscription of an event type and if the request matches the event type identified in the Register_EventType message 810. In such an arrangement, the Subscribe_EventType message 812 is sent sometime after the Register_EventType message 810 and does not immediately follow it.

Figure 8B:
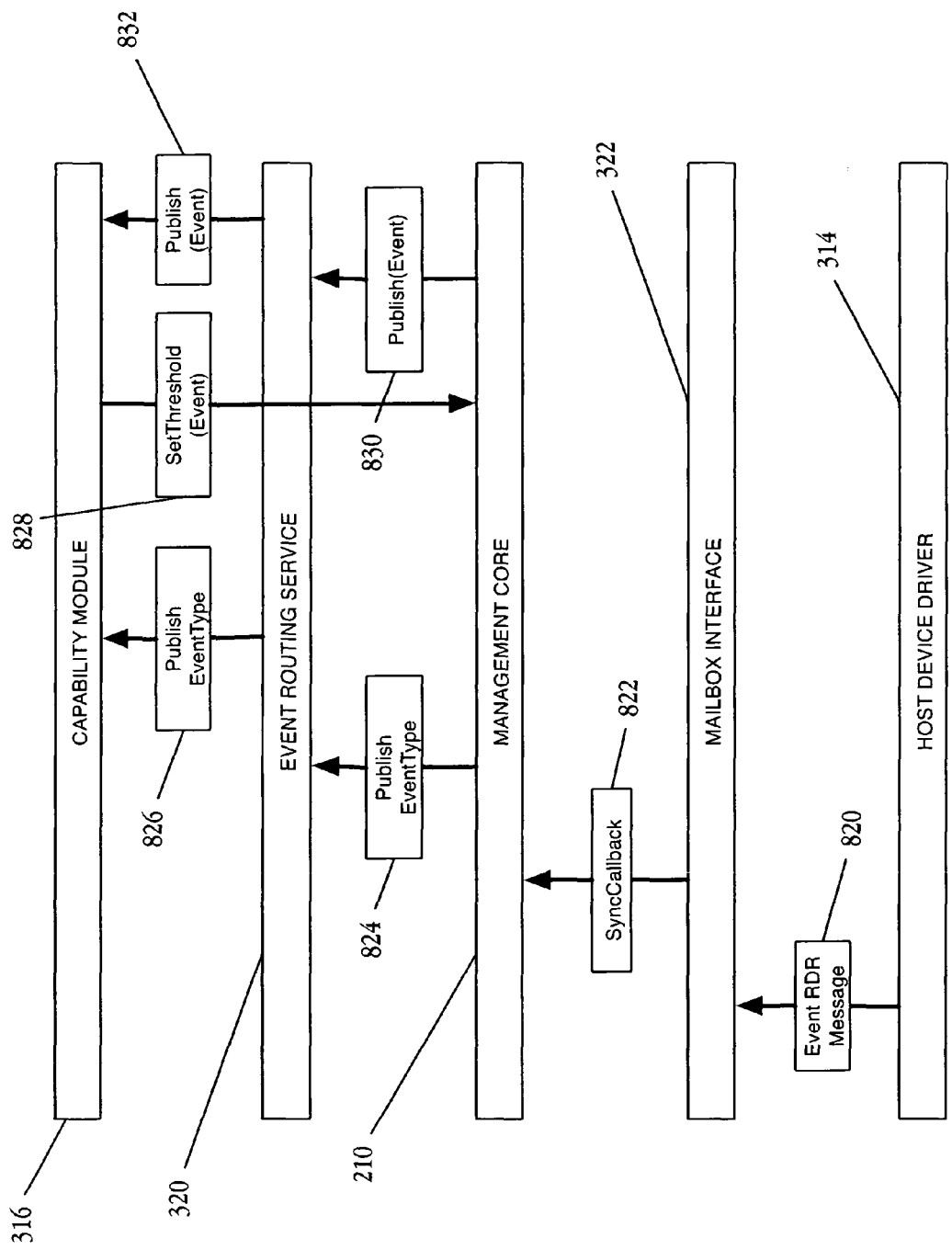
FIG. 8B is an example dataflow diagram to be carried out on a device according to embodiments of the present invention.

FIG. 8B is an exemplary dataflow diagram to be carried out on a device according to embodiments of the present invention. In an embodiment, FIG. 8B describes routine operations on a host device 102 after a host device driver has been discovered and event types have been subscribed to by one or more CMs 316 as described above.

In an embodiment, a host device driver 314 operating on a host device 102 regularly monitors conditions within a manageable resource. In one embodiment, the host device driver 314 periodically sends reports of those conditions as Event RDR messages 700 to the mailbox interface module 322. In another embodiment, the host device driver 314 is configured to only send reports of a condition in the form of an Event RDR message 700 if it meets a criteria set by the host device driver 314 itself. In a further embodiment, the host device driver 314 is configured to only send reports of a condition if the condition meets a criteria set by a CM 316, where the CM 316 communicated the criteria to the host device driver 314 through the management core 210. An example of such a criteria may be packets transmitted in a period of time. In such an example, it would be useful information if the management core 210 received event data of such type as it may be indicative of a condition where the network connection of the host device 102 has been compromised and is being used by unauthorized software processes. In either embodiment, the Event RDR message 700 is sent from the host device driver 314 to the mailbox interface 322. The mailbox interface 322 receives the Event RDR message 700 and sends a SyncCallback message 820 and the Event RDR message 700 to the management core 210. The management core 210 sends a first Publish_EventType message 822 to the event routing service, where the first Publish_EventType message 822 contains one or more of the following, without limitation: provider type 714, RDR type 712, Resource Type 716. A second Publish_EventType 824 message is sent to one or more CMs 316. In one embodiment, the second Publish_EventType 824 message prompts the CM 316 to set a threshold value for the event type using a SetThreshold(Event) message 826 sent to the management core 210 through the event routing service 320. In another embodiment, the threshold value for the event type may be set prior to receiving event messages. In either embodiment, the management core 210 determines if the event data received in the Event RDR message 700 exceeds a threshold value. If it does, the management core 210 sends a first Publish(Event) message 828 to the event routing service 320 which sends a second Publish(Event) message 830 to the one or more CMs 36 that are subscribed to those event types.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments and other embodiments not specifically described herein will be apparent to those of skill in the art upon reviewing the above description.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the scope or meaning of the claims. Additionally, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the terms "comprising" and "wherein," respectively. Moreover, the terms "first," "second," and "third," etc. are used merely as labels, and are not intended to impose numerical requirements on their objects.

What is claimed is:

1. An apparatus, comprising:
   one or more processors;
   an interface module executed by the one or more processors to receive event management data related to an event type from at least one host device driver, the interface module to send the event management data;
   an event routing service executed by the one or more processors to receive the event management data from the interface module; and
   at least one capability module coupled to the event routing service to receive the event management data for events characterized by event ids that the at least one capability module has subscribed to,
   wherein the interface module is a memory scan interface module, and
   wherein the memory scan interface module accesses the memory of a host device independently of the operating system of the host device,
   wherein the interface module, the event routing service, and the at least one capability module are part of a platform that is independent of the host device, and
   wherein the interface module, the event routing service, and the at least one capability module are executed within an environment isolated from the host device.

2. The apparatus of claim 1, wherein the event management data is an event resource data record.

3. The apparatus of claim 1, wherein the interface module is a mailbox interface module.

4. The apparatus of claim 3, wherein the mailbox interface module is to communicate with the at least one host device driver over a bus.

5. The apparatus of claim 4, wherein the mailbox interface module is to send control information to the at least one host device driver.

6. The apparatus of claim 4, wherein the bus includes a PCI bus.

7. The apparatus of claim 3, wherein the mailbox interface module is to communicate with the at least one host device driver using direct memory access.

8. The apparatus of claim 7, wherein the mailbox interface module is to communicate using first-in-first-out methods.

9. The apparatus of claim 1, wherein the memory scan interface module has Direct Memory Access to memory mapped registers of the host device independently of the operating system of the host device.

10. The apparatus of claim 1, wherein the at least one capability module is to set its particular threshold for an event and communicate the particular threshold to the event routing service.

11. A system, comprising:
   a host device, having at least one host device driver and at least one memory mapped register;
   a management device, including:
      an interface module to receive event management data related to an event type from the at least one host device driver, the interface module to send the event management data;
      an event routing service to receive the event management data from the interface module; and
      at least one capability module coupled to the event routing service to receive the event management data for events characterized by an event id that the at least one capability module has subscribed to; and
   a PCI bus to communicatively couple the host device to the management device,
   wherein the management device is to execute within an environment isolated from the host device wherein the host device cannot access the memory of the management device and further wherein the management device accesses the memory of the host device, and
   wherein the management device is to scan memory of the host device to determine one or more managed entities having one or more manageable resources on the host device.

12. The system of claim 11, wherein the event management data includes an event resource data record.

13. The system of claim 11, wherein the management device is to query the one or more managed entities for the one or more manageable resources.

* * * * *